T. PURVIS.
SELF HEATING SAD IRON.
APPLICATION FILED JULY 9, 1907.
898,922.
Patented Sept. 15, 1908.
3 SHEETS—SHEET 2.
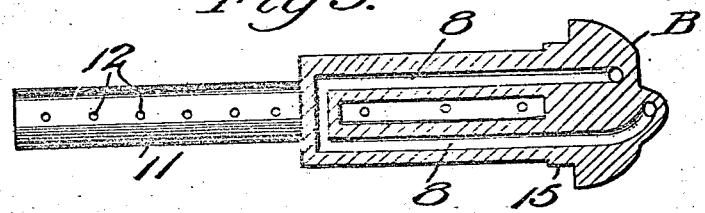
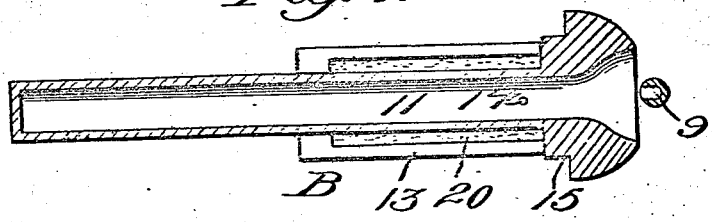
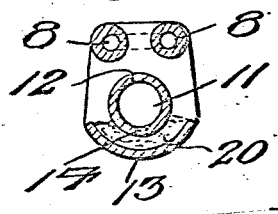
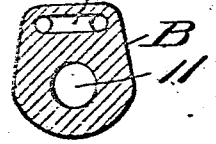
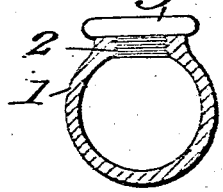
Inventor
Thomas Purvis,
Witnesses
By Victor J. Evans
Attorney

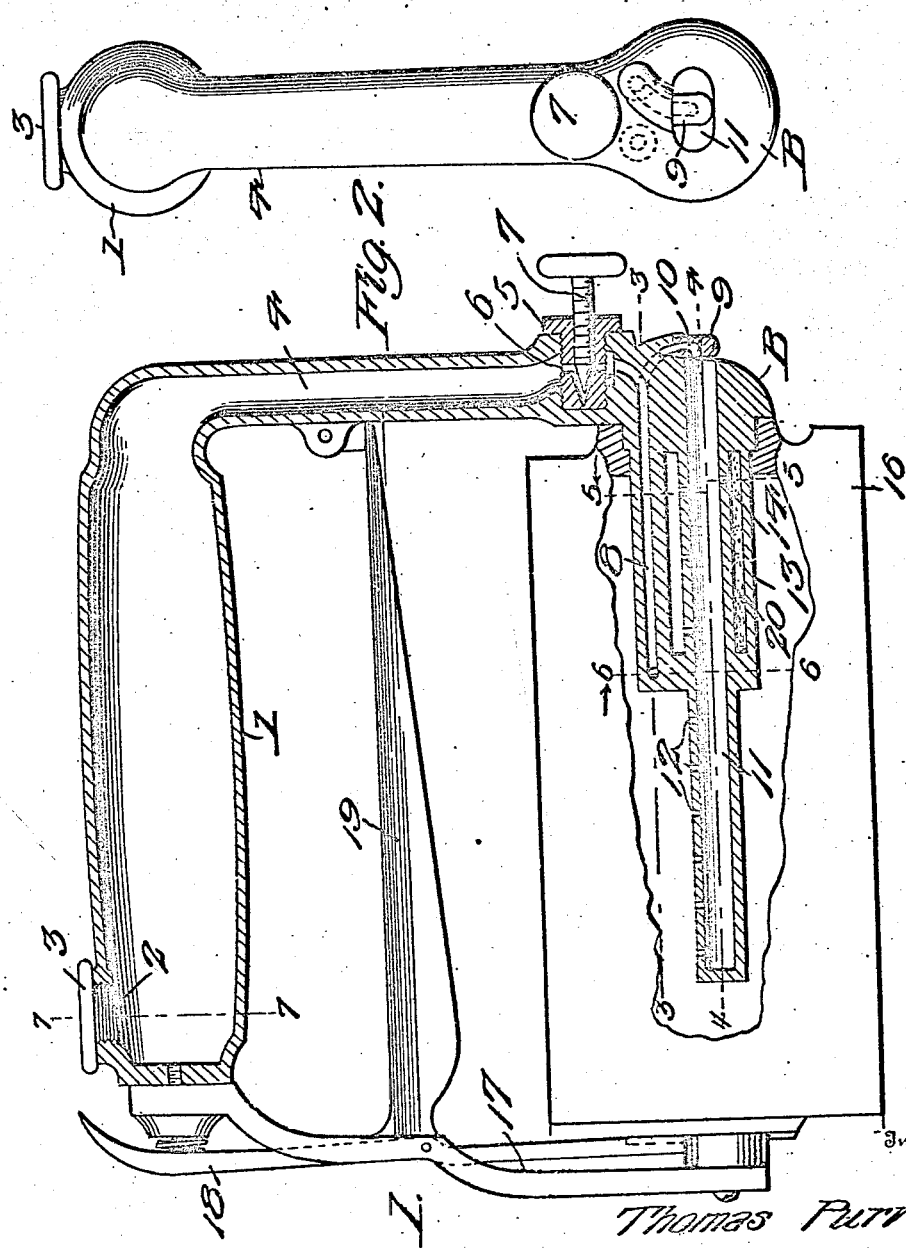

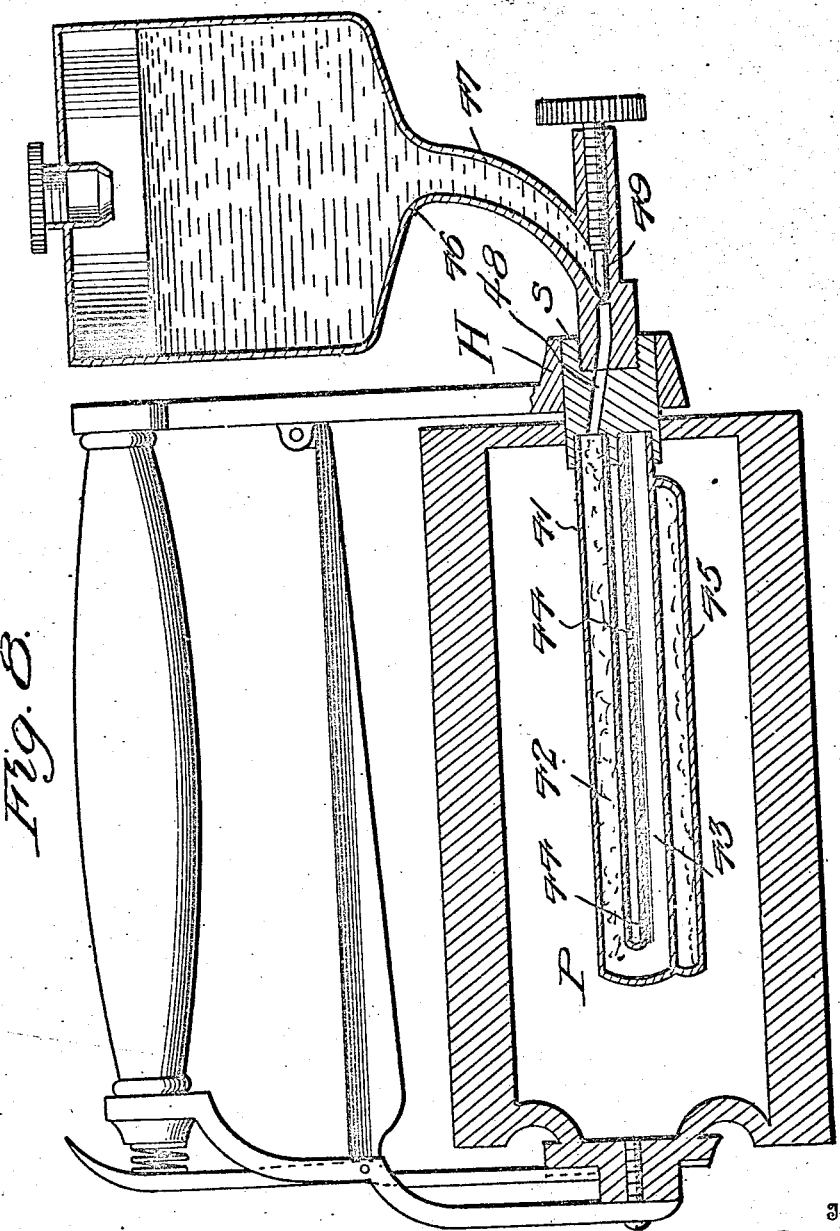

UNITED STATES PATENT OFFICE.

THOMAS PURVIS, OF NORTH BIRMINGHAM, ALABAMA.

SELF-HEATING SAD-IRON.

No. 898,922.  Specification of Letters Patent.  Patented Sept. 15, 1908.

Application filed July 9, 1907. Serial No. 382,888.

*To all whom it may concern:*

Be it known that I, THOMAS PURVIS, a citizen of the United States, residing at North Birmingham, in the county of Jefferson and State of Alabama, have invented new and useful Improvements in Self-Heating Sad-Irons, of which the following is a specification.

This invention relates to self-heating reversible sad irons of that class which are provided with a burner for the purpose of heating one face of the iron while the other face is in active use.

The invention has for its object to improve the construction of the burner, and to provide a supply tank which shall be conveniently located within the handle of the burner, so as to present no obstruction and so as to be out of sight.
Further objects of the invention are to simplify and improve the construction and operation of this class of devices; and with these and other ends in view which will readily appear as the nature of the invention is better understood, the same consists in the improved construction and novel arrangement and combination of parts which will be more fully described and particularly pointed out in the claims.
In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawings, Figure 1 is a vertical sectional view of a sad iron embodying the invention; Fig. 2 is an end elevation of that portion of the device which comprises the handle and the burner, detached. Fig. 3 is a horizontal sectional view taken on the plane indicated by the line 3—3 in Fig. 1. Fig. 4 is a horizontal sectional view taken on the plane indicated by the line 4—4 in Fig. 1. Figs. 5, 6 and 7 are cross sectional detail views taken on the plane indicated respectively by the lines 5—5, 6—6 and 7—7 in Fig.
1. Fig. 8 is a vertical longitudinal sectional view illustrating a modified form of the invention.

Corresponding parts in the several figures are denoted by like characters of reference.
The handle 1 of the improved sad iron is made hollow, so as to constitute a tank or reservoir, the same being provided near one end with a filling aperture 2 by which a closure is provided consisting of a screw plug 3. The handle 1 is provided at one end with a depending tubular arm 4 carrying at its lower end the burner body B which extends laterally beneath the handle. Inserted transversely in the tubular arm 4, adjacent to the burner body, is a screw plug 5 having an aperture or passage 6, the flow through which is regulated by a needle valve 7 housed in the plug 5.

The burner body has in its upper portion a U-shaped passage 8, best seen in Fig. 3 of the drawings, one end of which communicates with the passage 6, and through the latter with the tubular arm 4 and with the supply tank; the opposite end of the U-shaped passage 8 receives a nipple 9 which constitutes the burner tip, and which is provided with an L-shaped passage 10 discharging into the longitudinal bore 11 of the burner body, which latter is provided throughout the length thereof with flame orifices 12. The burner body is constructed or provided with a priming pan 13 adapted to receive liquid fuel through an aperture 14.

The burner body is provided with an annular shoulder 15 affording a bearing for one end of the body 16 of the sad iron; the opposite end of said body is pivoted upon an arm 17 connected with and depending from the end of the handle 1 opposite to the end having the depending tubular arm 4. A latch of ordinary construction, controlled by a thumb piece 18 serves to retain the body of the sad iron in position for operation, and a shield 19, to protect the hand of the operator from the heat is secured upon and extends between the arms 4 and 17.

From the foregoing description taken in connection with the drawings hereto annexed, the operation and advantages of this invention will be readily understood by those skilled in the art to which it appertains. The construction is extremely simple and compact, and the separate fuel tank, usually provided in this class of devices, is dispensed with; its place being supplied by the hollow handle 1 which may be readily made of ample dimensions to contain a supply of fuel sufficient to operate the device for a considerable period; at the same time the reservoir is very readily accessible for refilling, at any time. Various kinds of fuel may be employed in connection with the improved burner, but alcohol is preferred on account of its non-liability to form soot and smudge. The fuel passes by gravity through the tubular arm 4 and through the valved passage 6, where the flow is regulated by the valve 7, to the vaporizing chamber formed by the U-shaped passage 8. To start the burner, a small quantity of the fuel is discharged into the bore 11 from which it passes through the aperture 14 to the priming pan 13, which latter preferably contains a packing 20 of asbestos or other suitable porous refractory material; the latter being saturated with fuel, the same is ignited, and the body of the burner will soon be heated to a sufficient degree to cause fuel discharged into the vaporizing chamber to be converted into vapor which, in turn, is discharged through the nipple 9 into the bore 11; the front end of the latter being open for the admission of air which is admitted in sufficient quantities to form, in connection with the vapor, a highly inflammable gas which, issuing through the orifices 12, is ignited; the flames impinging upon the side of the body of the sad iron, which at the time, is uppermost. One face of the iron having been sufficiently heated, the body of the iron is reversed, and the device is then ready for operation; that side of the body of the iron which is uppermost being constantly exposed to the heating action of the flames.

The burner is extremely simple in construction and the parts of the device may be readily separated, when necessary for cleansing and other purposes, and re-assembled.

In Fig. 8 of the drawings there has been illustrated a modified form of the burner which, under some circumstances, will be deemed preferable. Under this modified construction the burner is composed of a single piece P of cold railroad steel pipe of small diameter, the same being bent or doubled upon itself, and the open ends of the pipe being seated in a socket S upon which the lower end of the handle, here designated H is pivoted. The upper branch or portion 41, of the pipe D contains a packing 42 of asbestos or other suitable material; the lower branch 43 of the pipe, which extends directly beneath the upper branch is provided with a plurality of flame orifices 44. A drip cup 45 is arranged beneath the lower branch of the pipe. In this form of the invention the liquid fuel is contained in a tank 6 having a discharge pipe 47 which is suitably connected with the supporting block S, the latter being provided with a duct 48 that connects the discharge pipe 47 with the upper branch 41 of the burner pipe; the flow of liquid from the tank to the burner pipe being controlled by a suitably arranged needle valve 49.

Having thus fully described the invention, what is claimed as new is:—

1. In a sad iron, the combination of a single piece structure comprising a hollow horizontally-extending handle closed at one end, a tubular depending arm on the opposite end of the handle and communicating with the hollow thereof, a burner body extending under the handle from the bottom end of the arm, said body having a longitudinal passage provided with upwardly-discharging openings and having a passage communicating with the hollow arm and terminating adjacent the outer end of the longitudinal passage, and a pan formed under the said body, the exterior of the body at the point adjacent the lower end of the said arm being of circular exterior to form a journal, with a hollow iron journaled at one end on the said body, an arm secured to the closed end of the said handle and depending therefrom, means for connecting the iron to the lower end of the second arm, and a valve controlling the flow of fuel from the first-mentioned arm to the vaporizing passage of the burner body.

2. A single piece casting comprising a hollow handle, a tubular arm on one end thereof, a burner body integrally connected with the arm and provided with a return vaporizing passage communicating with the arm and provided with a longitudinal passage having upwardly-discharging openings, and a pan formed at the bottom of the body for heating the vaporizing passage, said arm having an internally-threaded chamber, in combination with a ported plug screwed therein, a valve seat in the plug, a valve arranged to engage the seat, and a nipple arranged on the burner body at the discharge end of the vaporizing passage for delivering into the said longitudinal passage, the burner body having one portion provided with a circular exterior to form a journal.

In testimony whereof, I affix my signature in presence of two witnesses.

THOMAS PURVIS.

Witnesses:
W. G. TYLER,
C. M. GREEN.